(12) United States Patent
Kim et al.

(10) Patent No.: US 9,453,959 B2
(45) Date of Patent: Sep. 27, 2016

(54) BACKLIGHT UNIT AND DISPLAY APPARATUS

(75) Inventors: Bang Gun Kim, Seoul (KR); Moon Jeong Kim, Seoul (KR); Sung Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1398 days.

(21) Appl. No.: 13/072,875

(22) Filed: Mar. 28, 2011

(65) Prior Publication Data

US 2011/0242852 A1 Oct. 6, 2011

(30) Foreign Application Priority Data

Mar. 30, 2010 (KR) .................. 10-2010-0028435
Mar. 31, 2010 (KR) .................. 10-2010-0029215
Apr. 1, 2010 (KR) .................. 10-2010-0029816

(51) Int. Cl.
*F21V 3/00* (2015.01)
*F21V 8/00* (2006.01)

(52) U.S. Cl.
CPC ............ *G02B 6/008* (2013.01); *G02B 6/0091* (2013.01)

(58) Field of Classification Search
CPC .. G02B 6/008; G02B 6/0091; G02B 6/0088; G02B 6/0085; G02B 6/009; G02B 6/0031; G02B 6/0068; G02B 6/0096; G02B 6/0073; G02B 6/0051; G02B 6/0055; G02B 6/0093; G02B 19/0028; G02B 19/0066; G02B 6/0011; G02B 6/0035; G02B 6/005; G02B 6/0058; G02B 6/0081; G02B 6/0083; G02B 6/0086; G02B 19/0014; G02B 26/023; G02B 27/0972; G02B 3/005; G02B 3/0056; G02B 3/04; G02B 5/021; G02B 5/0268; G02B 5/0278; G02B 5/045; G02B 5/1876; G02B 5/1885; G02B 5/30; G02B 6/0001; G02B 6/0006; G02B 6/001; G02B 6/0018; G02B 6/0023; G02B 6/003; G02B 6/0033; G02B 6/0036; G02B 6/0038; G02B 6/0041; G02B 6/006; G02B 6/0061; G02B 6/0078; G02B 6/08; G02F 1/133603; G02F 1/133615; G02F 1/133308; G02F 2001/133317; G02F 2001/133314; G02F 1/133605; G02F 1/133606; G02F 1/133608; G02F 2001/133628; G02F 2001/133322; G02F 2001/133607; G02F 2201/46; G02F 2201/465; G02F 1/1335; G02F 1/1336; G02F 1/133609; G02F 1/133611; G02F 2001/133325; G02F 1/1333; G02F 2001/13332; G02F 2001/133614; G02F 2201/34; G02F 1/01; G02F 1/0105; G02F 1/113; G02F 1/13; G02F 1/13336; G02F 1/13338; G02F 1/133385; G02F 1/133504; G02F 1/133512; G02F 1/133553; G02F 1/133602; G02F 1/133617; G02F 1/13362; G02F 1/133621; G02F 1/13452; G02F 2001/133328; G02F 2001/133331; G02F 2001/13354; G02F 2001/133394; G02F 2001/133612; G02F 2001/133624; G02F 2201/36; G02F 2201/503; G02F 2201/54; G02F 2202/28; G02F 2203/03; G02F 2203/05; G02F 2203/055; G09F 13/04; G09F 13/0413; G09F 9/35; G09F 13/18; G09F 13/0409; G09F 13/14; G09F 13/22; G09F 3/10; G09F 9/30; G09F 9/3026; G09F 9/33; F21V 7/00; F21V 5/04; F21V 13/04; F21V 21/00; F21V 33/0052; F21V 13/12; F21V 7/04; F21V 11/00; F21V 17/06; F21V 29/22; F21V 29/24; F21V 7/0008; F21V 7/005; F21V 7/0091; F21V 9/00; F21V 13/02; F21V 15/06; F21V 17/10; F21V 17/101; F21V 17/12; F21V 17/164; F21V 19/00; F21V 23/009; F21V 29/00; F21V 29/02; F21V 29/027; F21V 5/007; F21V 5/046; F21V 5/048; F21V 7/0016; F21V 7/0033; F21V 7/0066; F21V 9/10; F21V 9/16
USPC ............. 362/257, 310, 311.01, 311.02, 600, 362/633, 634, 97.1–97.4
See application file for complete search history.

(56) References Cited

U.S. PATENT DOCUMENTS

| | | | |
|---|---|---|---|
| 5,703,667 A * | 12/1997 | Ochiai ............................ | 349/65 |
| 7,604,390 B2 * | 10/2009 | Zhang et al. .................. | 362/634 |
| 2002/0093811 A1 * | 7/2002 | Chen ................................ | 362/31 |
| 2004/0150981 A1 * | 8/2004 | Katsuda et al. ................ | 362/31 |
| 2007/0008449 A1 | 1/2007 | Choi ............................... | 349/58 |
| 2007/0147092 A1 * | 6/2007 | Fu ....................... | G02B 6/0088 |
| | | | 362/633 |
| 2007/0165421 A1 | 7/2007 | Sakai et al. .................... | 362/612 |
| 2007/0211191 A1 | 9/2007 | Cho et al. ...................... | 349/58 |
| 2008/0130315 A1 * | 6/2008 | Song ............................. | 362/617 |

| | | | | |
|---|---|---|---|---|
| 2009/0128732 A1* | 5/2009 | Hamada | ................ | G02B 6/0068 349/58 |
| 2010/0079981 A1* | 4/2010 | Chen et al. | ................... | 362/97.2 |
| 2011/0141162 A1 | 6/2011 | Seo et al. | ....................... | 348/690 |

FOREIGN PATENT DOCUMENTS

| | | |
|---|---|---|
| CN | 102102833 A | 6/2011 |
| EP | 1 835 330 A1 | 9/2007 |
| JP | 2006-269365 A | 10/2006 |
| JP | 2007-335324 A | 12/2007 |
| JP | 2009-070663 A | 4/2009 |
| KR | 10-2005-0090503 A | 9/2005 |
| KR | 10-2006-0107713 A | 10/2006 |
| KR | 10-2007-0053517 A | 5/2007 |
| KR | 10-2007-0076496 A | 7/2007 |
| KR | 10-2007-0079873 A | 8/2007 |
| KR | 10-0764447 B1 | 10/2007 |
| KR | 10-2008-0062833 A | 7/2008 |
| KR | 10-0852249 B1 | 8/2008 |
| KR | 10-2008-0089909 A | 10/2008 |
| KR | 10-0876248 B1 | 12/2008 |
| KR | 10-2009-0027440 A | 3/2009 |
| KR | 10-2009-0115523 A | 11/2009 |
| KR | 10-2009-0121926 A | 11/2009 |
| KR | 10-2010-00001545 A | 1/2010 |
| KR | 10-2010-00024324 A | 3/2010 |

OTHER PUBLICATIONS

Korean Office Action dated May 18, 2011 issued in Application No. 10-2010-0029215.

* cited by examiner

*Primary Examiner* — Stephen F Husar

*Assistant Examiner* — Danielle Allen

(74) *Attorney, Agent, or Firm* — Ked & Associates LLP

(57) ABSTRACT

Provided is a backlight unit, which includes at least one supporter, at least one light guide panel, and at least one light emitting module. The supporter includes a recess stepped at a lower height than that of a first region of an upper surface. The light guide panel is disposed on the supporter and is coupled to the supporter. The light emitting module is disposed in the recess of the supporter and provides light through a side surface of the light guide panel.

20 Claims, 15 Drawing Sheets

BACKLIGHT UNIT AND DISPLAY APPARATUS

The present application claims priority under 35 U.S.C. §119 of Korean Patent Application No. 10-2010-0028435 filed Mar. 30, 2010, Korean Patent Application No. 10-2010-0029215 filed Mar. 31, 2010, and Korean Patent Application No. 10-2010-0029816 filed Apr. 1, 2010, which are hereby incorporated by reference in its entirety.

BACKGROUND

The present disclosure relates to a backlight unit and a display apparatus.

Light emitting diodes (LEDs) comprise light sources formed of GaAs-based, AlGaAs-based, GaN-based, InGaN-based, and InGaAlP-based semiconductor compounds.

Such light emitting diodes are packaged to function as light emitting devices for emitting light having various colors. The light emitting devices are used as light sources of various devices such as lamp-on indicators for emitting light of colors, character displays, and image displays.

SUMMARY

Embodiments provide a backlight unit and a display apparatus, which have a novel structure.

Embodiments provide a backlight unit and a display apparatus, which makes it easy to align a light emitting module with a light guide panel.

Embodiments provide a backlight unit and a display apparatus, which makes it easy to couple a light emitting module with a supporter.

Embodiments provide a backlight unit and a display apparatus, which can be easily assembled.

Embodiments provide a backlight unit and a display apparatus, which stably operate regardless of variations in temperature and moisture.

Embodiments provide a backlight unit and a display apparatus, which have uniform brightness.

In one embodiment, a backlight unit comprises: at least one supporter comprising a recess stepped at a lower height than that of a first region of an upper surface; at least one light guide panel disposed on the supporter and coupled to the supporter; and at least one light emitting module disposed in the recess of the supporter and providing light through a side surface of the light guide panel.

In another embodiment, a display apparatus comprises: a display panel; and a backlight unit disposed under the display panel, wherein the backlight unit comprises: at least one supporter comprising a recess stepped at a lower height than that of a first region of an upper surface; at least one light guide panel disposed on the supporter and coupled to the supporter; and at least one light emitting module disposed in the recess of the supporter and providing light through a side surface of the light guide panel.

The details of one or more embodiments are set forth in the accompanying drawings and the description below. Other features will be apparent from the description and drawings, and from the claims.

DETAILED DESCRIPTION OF THE EMBODIMENTS

Figure 1:
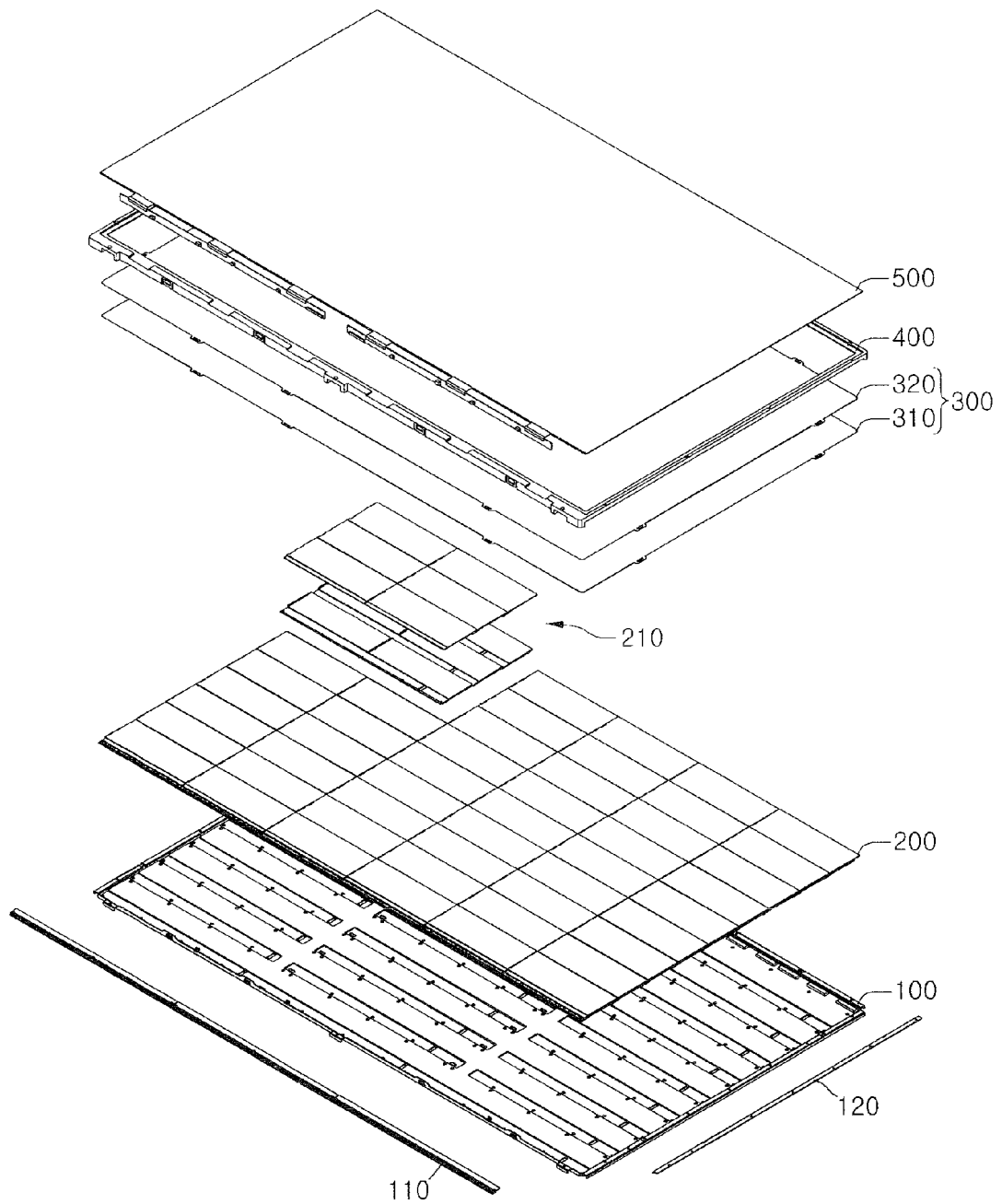
FIG. 1 is an exploded perspective view illustrating a display apparatus comprising a backlight unit according to an embodiment.

In the description of embodiments, it will understood that when a layer (or film) is referred to as being 'on' another layer or substrate, it can be directly on another layer or substrate, or intervening layers may also be present. Further, it will be understood that when a layer is referred to as being 'under' another layer, it can be directly under another layer, and one or more intervening layers may also be present. In addition, it will also be understood that when a layer is referred to as being 'between' two layers, it can be the only layer between the two layers, or one or more intervening layers may also be present. Further, the reference about 'on' and 'under' each layer will be made on the basis of drawings.

In the drawings, the thickness or size of each layer is exaggerated, omitted, or schematically illustrated for convenience in description and clarity. Also, the size of each element does not entirely reflect an actual size.

Hereinafter, embodiments will be described with reference to the accompanying drawings.

Figure 2:
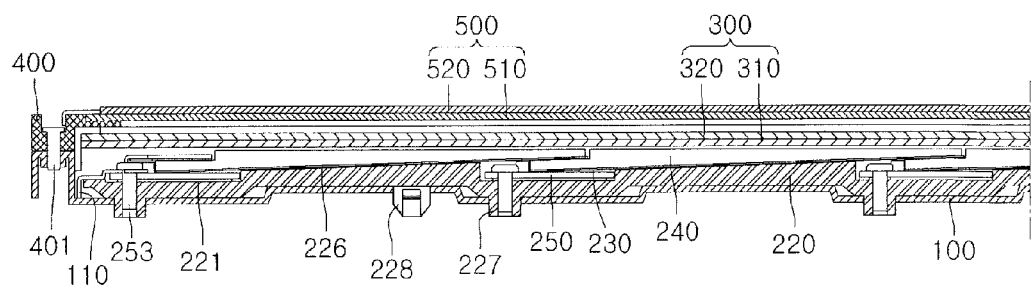
FIG. 2 is a cross-sectional view illustrating a display apparatus comprising a backlight unit according to an embodiment.

FIG. 1 is an exploded perspective view illustrating a display apparatus comprising a backlight unit according to an embodiment. FIG. 2 is a cross-sectional view illustrating a display apparatus comprising a backlight unit according to an embodiment.

Referring to FIGS. 1 and 2, a display apparatus according to an embodiment comprises a first frame 100, a backlight unit 200 disposed on the first frame 100, optical sheets 300 disposed on the backlight unit 200, a second frame 400 disposed on the optical sheets 300 and coupled to the first frame 100, and a liquid crystal panel 500 as a display panel supported by the second frame 400.

A back cover may be disposed under the first frame 100. A front cover is disposed on the front surface of the liquid crystal panel 500 and is coupled to the back cover.

The first frame 100 may provide a space for receiving the backlight unit 200 and is coupled to the backlight unit 200. For example, the first frame 100 may be formed of a metal.

The backlight unit 200 may be accommodated in the space provided by the first frame 100, and generates and emits light to the liquid crystal panel 500.

The optical sheets 300 may be disposed on the front surface of the backlight unit 200 and uniformly spread light emitted from the backlight unit 200. For example, the optical sheets 300 may comprise a spread sheet 310 spreading light provided from the backlight unit 200, a prism sheet 320 concentrating light provided from the spread sheet 310, and a fluorescence sheet comprising a brightness enhancement film or a phosphor. The type and number of sheets constituting the optical sheets 300 are not limited to the embodiment of FIG. 1.

The second frame 400 may be coupled to the first frame 100 to support and fix the optical sheets 300. For example, the second frame 400 may be coupled to the first frame 100 by screws 401.

The liquid crystal panel 500 may be disposed on the second frame 400. The liquid crystal panel 500 may be supported by the second frame 400 and display an image by using an image signal provided from a controller and light provided from the backlight unit 200. The liquid crystal panel 500 comprises a first substrate 510 and a second substrate 520, which are adhered to face each other with a uniform cell gap. A liquid crystal layer is disposed between the first substrate 510 and the second substrate 520. The first substrate 510 comprises a plurality of gate lines and a plurality of data lines crossing the gate lines. Thin film transistors (TFTs) may be disposed at junctions of the gate lines and the data lines. Color filters may be disposed on the second substrate 520, but the structure of the liquid crystal panel 500 is not limited thereto. For example, the first substrate 510 may comprise color filters as well as thin film transistors. The structure of the liquid crystal panel 500 may depend on a method of driving the liquid crystal layer.

FIGS. 3 to 6 are schematic views illustrating a backlight unit according to an embodiment.

Referring to FIGS. 1 to 6, the backlight unit 200 according to an embodiment comprises supporters 220, reflective sheets 230 disposed on the supporters 220, light guide panels 240 disposed on the reflective sheets 230, and light emitting modules 250 disposed at a side of the light guide panels 240 to provide light to the light guide panels 240. The light emitting module 250 may comprise a printed circuit board 251 and at least one light emitting device 252 disposed over the printed circuit board 251. The light emitting devices 252 may be constituted by light emitting diodes (LEDs), and may comprise one of an LED emitting red light, an LED emitting green light, an LED emitting white light, and an LED emitting ultraviolet (UV) light.

The supporters 220 may be formed of a metal or a resin. For example, the supporter 220 formed of a resin through injection molding is light-weight, and can be easily processed.

The supporter 220 may be provided in at least one. That is, when only one of the supporters 220 is provided, the supporter 220 may have a size corresponding to the size of the first frame 100. Alternatively, when the supporter 220 is provided in plurality, the supporters 220 may be adjacent to each other and have a smaller size than the size of the first frame 100.

Figure 3:
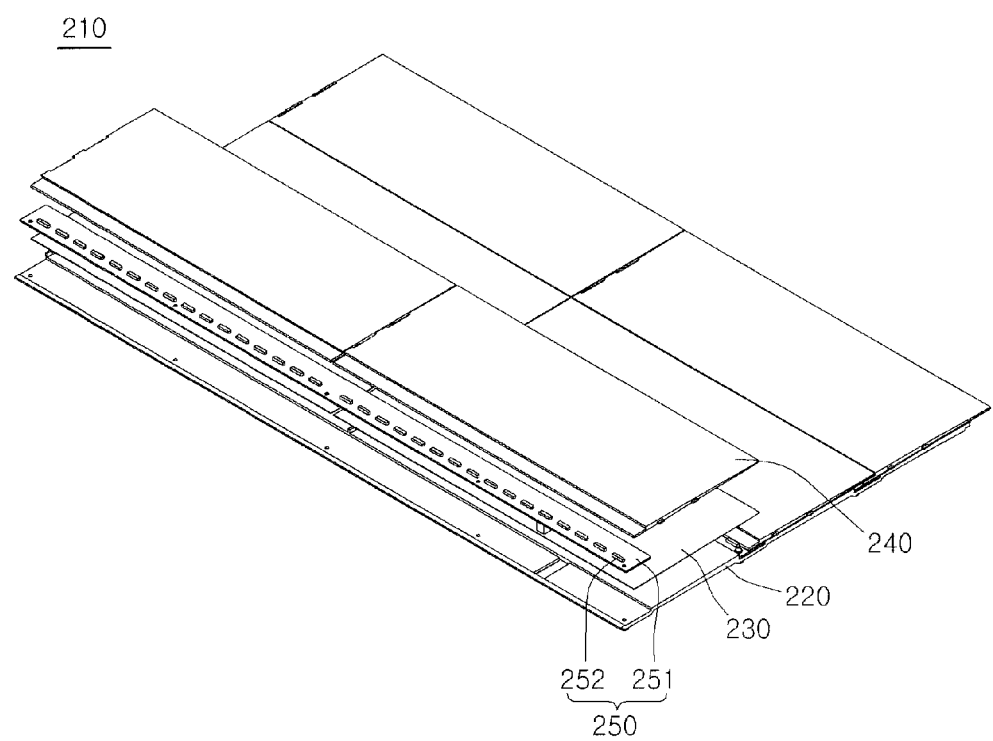
FIGS. 3 to 6 are schematic views illustrating a backlight unit according to an embodiment.

Referring to FIGS. 1 and 3, a unit of backlight modules 210 comprises the supporters 220 having a smaller size than the size of the first frame 100, at least one of the reflective sheets 230 provided on the supporters 220, at least one of the light guide panels 240, and at least one of the light emitting modules 250.

For example, in the backlight unit 200 as illustrated in FIG. 1, the number of the units of backlight modules 210 disposed over the first frame 100 that is rectangular is nine. That is, the number of the units of backlight modules 210 arrayed along a long side of the first frame 100 is three, and the number of the units of backlight modules 210 arrayed a short side thereof is three. As a matter of course, the supporter 220 may be provided in only one, as described above.

At least one of the reflective sheets 230, at least one of the light guide panels 240, and at least one of the light emitting modules 250 are disposed over the supporter 220 of the unit of backlight module 210. For example, the number of the reflective sheets 230 and the number of the light guide panels 240 over the supporter 220 may be six, and the number of the light emitting modules 250 disposed over the supporter 220 may be three. That is, the number of the reflective sheets 230 arrayed along a long side of the supporter 220 and the number of the light guide panels 240 arrayed along the long side may be two, and the number of the reflective sheets 230 arrayed along a short side of the supporter 220 and the number of the light guide panels 240 arrayed along the short side may be three. The number of the light emitting modules 250 arrayed along the short side of the supporter 220 may be three.

Light emitted from the light emitting modules 250 is reflected to the front side of the light guide panels 240 by the reflective sheets 230. When the supporter 220 is formed of a material having high reflectivity, the reflective sheets 230 may be removed. The reflective sheet 230 may be replaced with a reflective coating layer formed on the light guide panel 240 and/or the supporter 220.

The light emitting module 250 may be disposed at a side surface of the light guide panel 240 to provide light to the light guide panel 240. That is, the light guide panels 240 and the light emitting modules 250 are disposed at positions to overlap the liquid crystal panel 500.

The shapes and numbers of the components of the backlight unit 200 as described above may be varied within the scope of the present invention.

The backlight unit 200 has a plurality of divisional driving regions for local dimming. For example, each of the light emitting modules 250 disposed over the first frame 100 may be independently or simultaneously turned on/off. That is, the light emitting modules 250 independently provide light to the light guide panels 240 disposed over the first frame 100. Thus, brightness values of the divisional driving regions corresponding to the liquid crystal panel 500 can be adjusted according to an image signal provided to the liquid crystal panel 500, thereby improving the contrast of an image and reducing power consumption.

Figure 4:
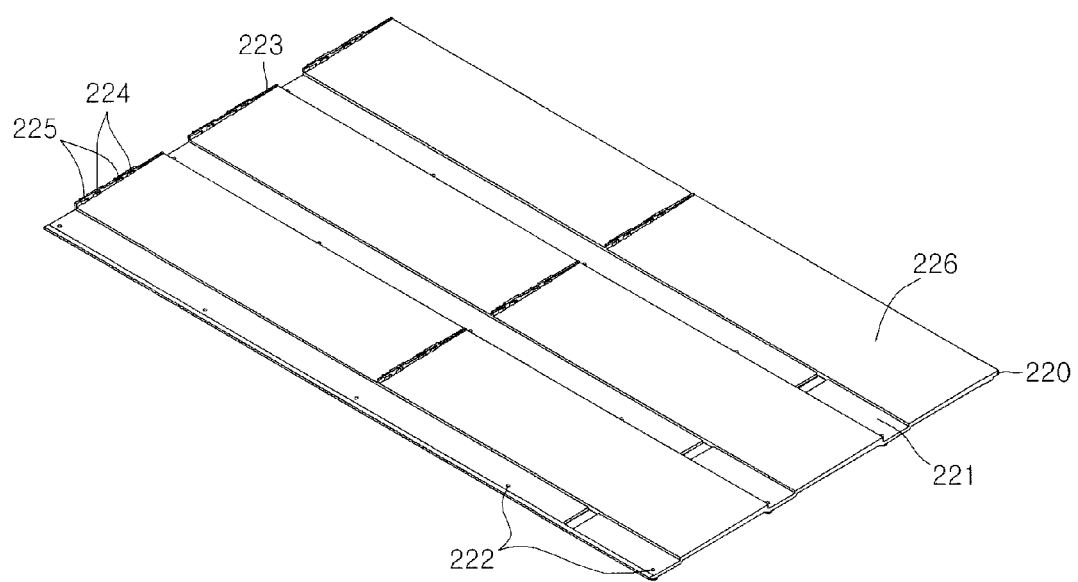

Referring to FIGS. 2 to 4, the supporter 220 may comprise recess 221 and inclination surfaces 226 on the upper surface thereof. The light emitting module 250 may be disposed in the recess 221, and the reflective sheet 230 and the light guide panel 240 may be disposed on the inclination surface 226. The recess 221 may be stepped at a lower height than that of a first region of the upper surface of the supporter 220. That is, the recess 221 may be stepped from the inclination surface 226. Protrusions 223 are disposed at the center and a side of the supporter 220, and a first coupling part 224 and a second coupling part 225 are disposed on the protrusion 223. The first coupling part 224 and the second coupling part 225 may be provided in the form of a hole or a recess.

Although the protrusions 223 are disposed at the center and the side of the supporter 220 according to the current embodiment, the protrusion 223 may be disposed at another side of the supporter 220 according to another embodiment. Furthermore, the protrusion 223 may be disposed at one or both sides of the supporter 220 except for the center of the supporter 220. The number and shape of the protrusions 223 may be varied according to a method of disposing the light guide panels 240.

Figure 5:
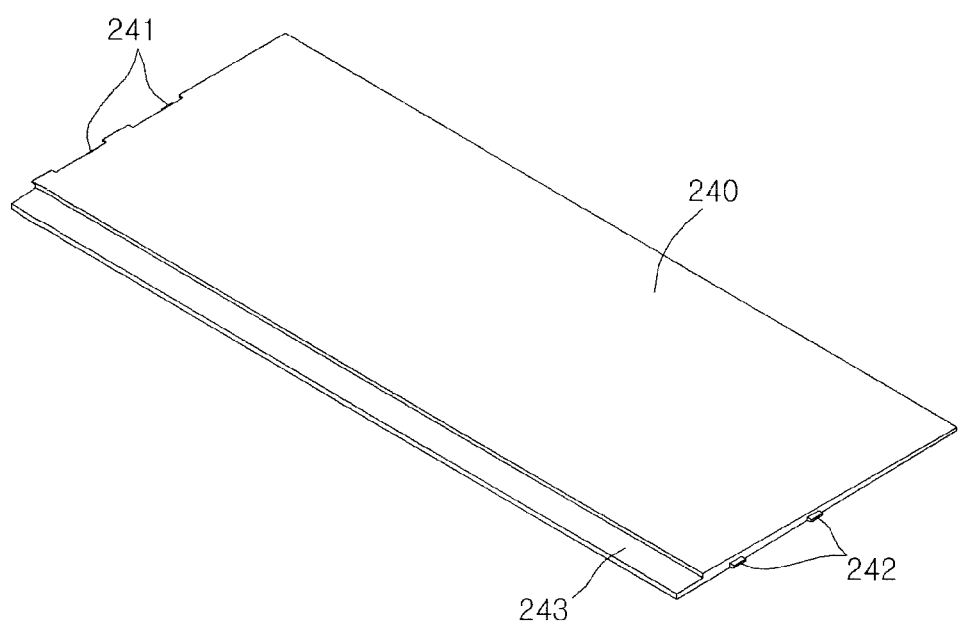

Referring to FIG. 5, the light guide panel 240 comprises first protrusions 241 and second protrusions 242 on both side surfaces thereof, and a light incident portion 243 receiving light from the light emitting module 250. The light guide panel 240 may be disposed on the recess 221 and the inclination surface 226 of the supporter 220, and the light incident portion 243 is disposed on the recess 221 and thus is adjacent to the light emitting device 252 of the light emitting module 250.

Figure 6:
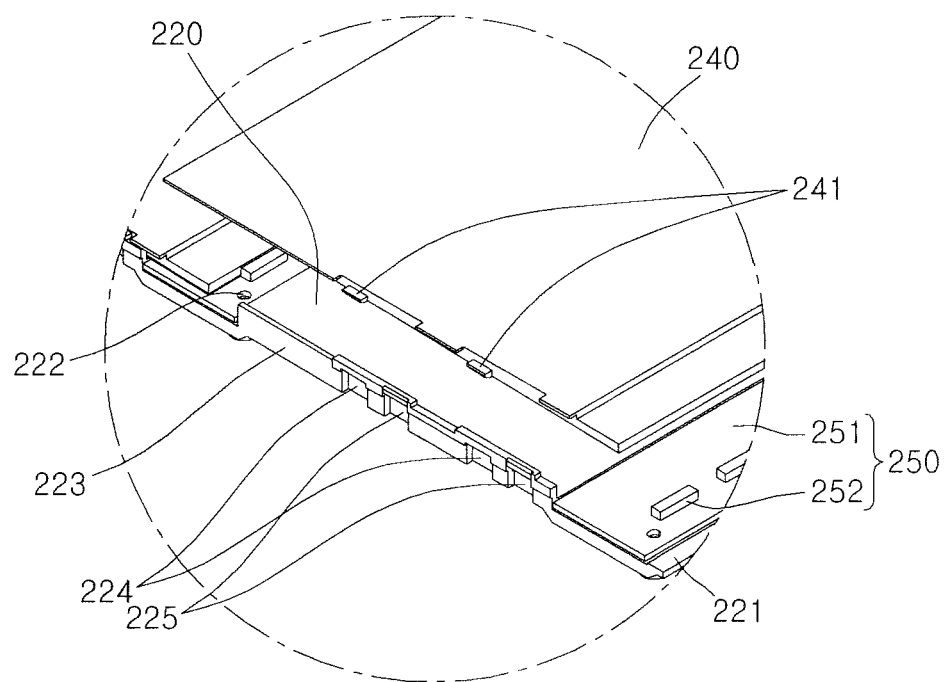

Referring to FIG. 6, the first protrusions 241 are coupled to the first coupling parts 224 of the supporter 220, and the second protrusions 242 are coupled to the second coupling parts 225 of the supporter 220. Thus, the light guide panel 240 and the supporter 220 can be simply assembled just by protrusion/hole coupling or protrusion/recess coupling.

For example, the first coupling parts 224 of the protrusion 223 disposed at the center of the supporter 220 are coupled to the first protrusions 241 of the light guide panel 240 disposed at the right side of the protrusion 223, and the second coupling parts 225 of the protrusion 223 disposed at the center of the supporter 220 are coupled to the second protrusions 242 of the light guide panel 240 disposed at the left side of the protrusion 223. Thus, since the light guide panels 240 disposed at both sides of the protrusion 223 are coupled to the protrusion 223, a gap between the light guide panels 240 disposed at both the sides of the protrusion 223 can be reduced, thereby preventing a dark or bright line due to the gap.

Figure 12:
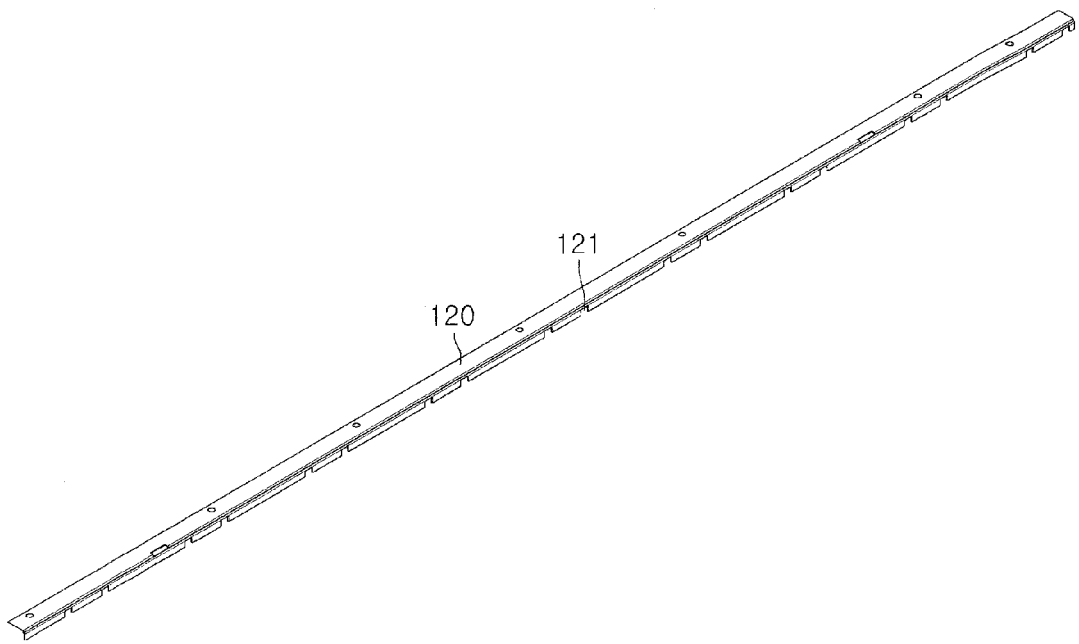
FIG. 12 is a schematic view illustrating a coupling member of a backlight unit according to an embodiment.

Referring to FIGS. 1 and 12, a coupling member 120 may comprise coupling parts 121 that are the same as or similar to the second coupling parts 225 of the protrusion 223. The coupling parts 121 may be coupled to the second protrusions 242 of the light guide panels 240. That is, since the supporter 220 comprises the protrusions 223 at the center and left side thereof, and the second protrusions 242 of the light guide panel 240 disposed at the right side of the backlight unit 200 cannot be coupled to the second coupling parts 225 of the protrusion 223, the coupling member 120 is coupled to the first frame 100 to support the light guide panel 240 disposed at the right side of the backlight unit 200.

The supporter 220 may be formed of a resin, and the light guide panel 240 may be formed of a resin. For example, the supporter 220 and the light guide panel 240 may comprise polycarbonate and be formed of the same material. The supporter 220 and the light guide panel 240 may comprise polymethyl methacrylate (PMMA). The supporter 220 and the light guide panel 240 may be formed of different resins that are similar in property. For example, the supporter 220 may be formed of one of polycarbonate and PMMA, and the light guide panel 240 may be formed of the other.

Since the supporter 220 and the light guide panel 240 are formed of the same or similar resins, the supporter 220 and the light guide panel 240 are the same or similar in expansion and contraction due to heat or moisture. Thus, when the light guide panel 240 is expanded or contracted by heat or moisture, the supporter 220 is also expanded or contracted. Accordingly, bending of the light guide panel 240 is prevented to improve brightness uniformity of light transmitted by the light guide panel 240.

For example, when the light guide panel 240 is formed of a material having a coefficient of thermal expansion of about $6.0 \times 10^{-6}$ mm/m° C., and the supporter 220 comprises a zinc-plated steel plate having a coefficient of thermal expansion of about $11.7 \times 10^{-6}$ mm/m° C., the light guide panel 240 may be bent by the difference between the coefficients of thermal expansion. Especially, if the light guide panel 240 is coupled to the supporter 220 by a screw, the light guide panel 240 may be further bent.

According to the current embodiment, since the light guide panel 240 and the supporter 220 are assembled through protrusion/hole coupling or protrusion/recess coupling, a tolerance for expansion and contraction is ensured. In addition, since the light guide panel 240 and the supporter 220 are formed of the same or similar materials, a tolerance for expansion and contraction is also ensured.

The supporter 220 is coupled to the first frame 100, and the light emitting module 250 is disposed over the recess 221 as illustrated in FIGS. 2 to 5 and FIG. 10. The printed circuit board 251 is coupled to the supporter 220 by coupling screws 253 to screw holes 222 of the printed circuit board 251. Alternatively, the printed circuit board 251 may be coupled to the supporter 220 through an adhesive material or a double-sided adhesive tape.

The light emitting devices 252 of the light emitting module 250 faces the light incident portion 243 of the light guide panel 240. The light incident portion 243 adjacent to the light emitting devices 252 may be brighter than the other portions of the light guide panel 240. However, since the reflective sheet 230 is disposed under the light incident portion 243, light emitted from the light guide panel 240 can have uniform brightness.

The light guide panel 240 may be disposed over the light emitting module 250 and the inclination surface 226, and the reflective sheet 230 is disposed under the light guide panel 240.

The printed circuit board 251 may be disposed in the recess 221 of the supporter 220a, and the light emitting devices 252 are disposed over the printed circuit board 251 to face the light incident portion 243 of the light guide panel 240. Alternatively, the printed circuit board 251 may be coupled to the supporter 220 through the screws 253, an adhesive material, or a double-sided adhesive tape.

Figure 11:
FIG. 11 is a schematic view illustrating a fixing member constituting a backlight unit and a display apparatus according to an embodiment.

Neighboring ones of the light guide panels 240 overlap each other over the recess 221. Thus, a movement of the light guide panels 240 due to an external shock can be prevented. Referring to FIGS. 1, 2 and 11, a fixing member 110 is coupled to the light guide panels 240 disposed at an end of the backlight unit 200, to prevent a movement of the light guide panels 240 and direct emission of light from the light incident portion 243 to the liquid crystal panel 500.

Figure 7:
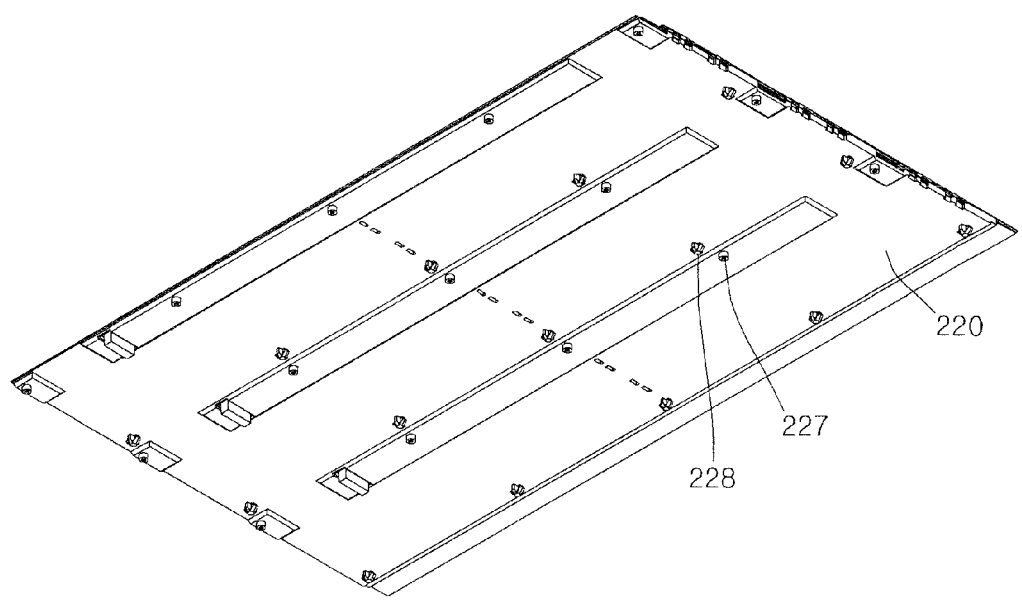
FIGS. 7 to 9 are schematic views illustrating a coupling structure between a supporter and a first frame in a backlight unit and a display apparatus according to an embodiment.
Figure 8:
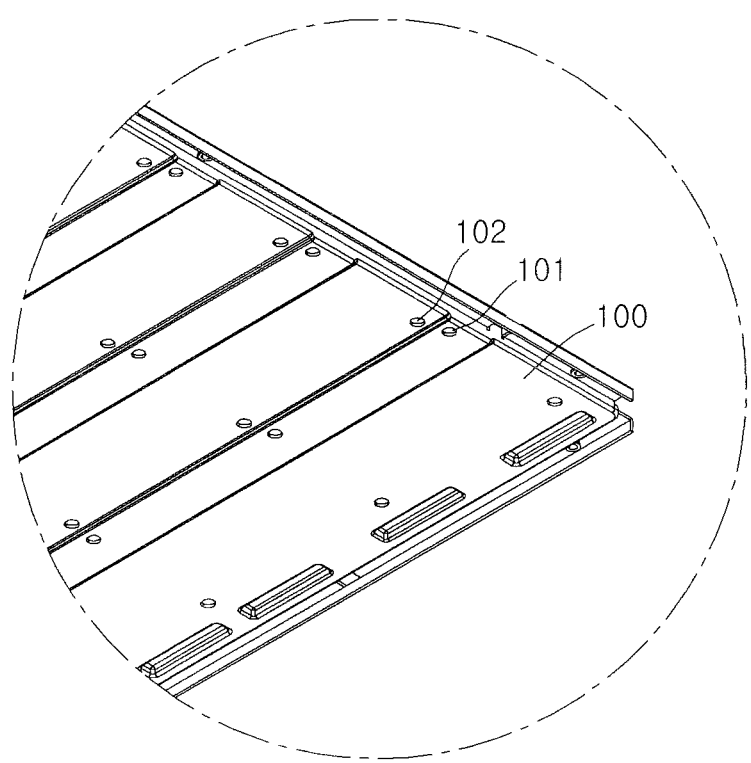
Figure 9:
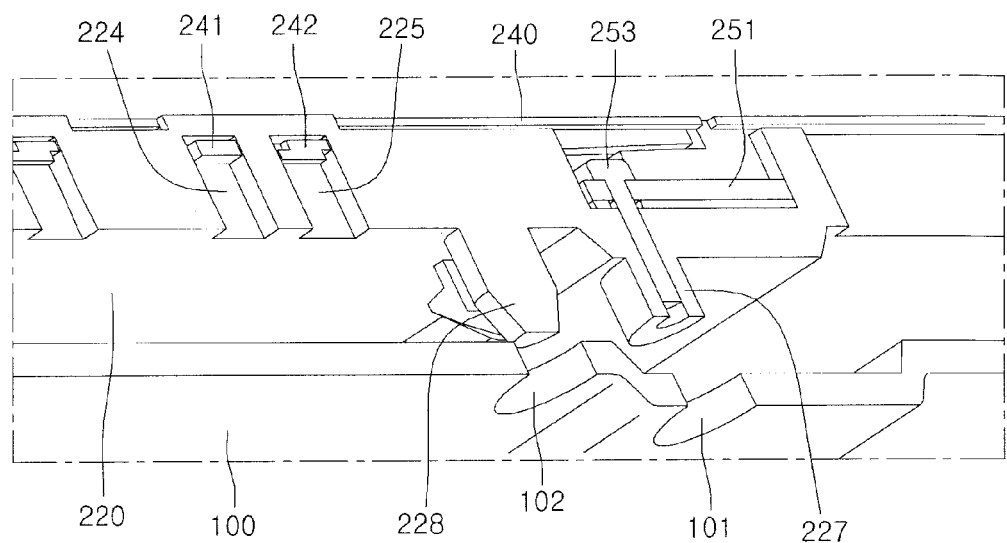
Figure 10:
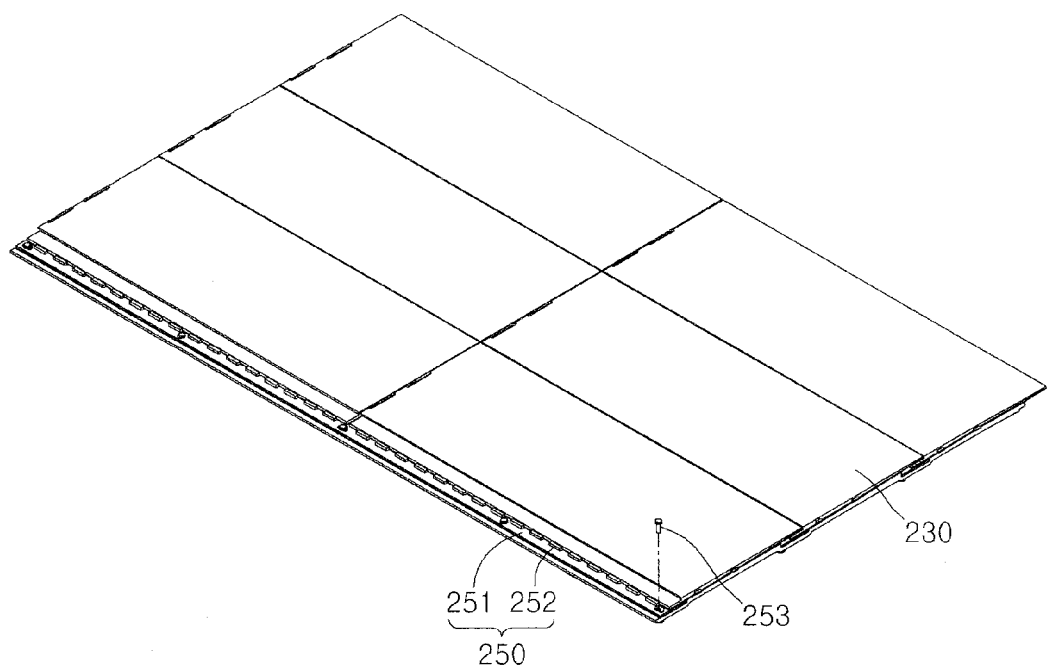
FIG. 10 is a schematic view illustrating coupling of a light emitting module with a supporter in a backlight unit according to an embodiment.

FIGS. 7 to 9 are schematic views illustrating a coupling structure between a supporter and a first frame in a backlight unit and a display apparatus according to an embodiment.

Referring to FIGS. 7 to 9, the supporter 220 comprises bosses 227 and coupling protrusions 228 on the lower surface thereof. The first frame 100 comprises first holes 101 receiving the bosses 227, and second holes 102 receiving the coupling protrusions 228.

When the supporter 220 is coupled to the first frame 100, the bosses 227 guide the position of the supporter 220. The screws 253 are inserted and coupled to the bosses 227. The screws 253 couple the printed circuit board 251 to the supporter 220 as described above.

The coupling protrusions 228 are coupled to the second holes 102 through hooking.

Since the supporter 220 is coupled to the first frame 100 by the coupling protrusions 228 and the second holes 102, an assembly process is simplified. Coupling parts such as a screw or rivet may be used to improve the coupling force between the supporter 220 and the first frame 100.

The printed circuit board 251 may be disposed in the recess 221 of the supporter 220, and the light emitting devices 252 are disposed over the printed circuit board 251 to face the light incident portion 243 of the light guide panel 240. In this case, the printed circuit board 251 may be coupled to the supporter 220 through the screws 253, an adhesive material, or a double-sided adhesive tape. If the printed circuit board 251 is disposed at an inappropriate position on the supporter 220, or a portion of the printed circuit board 251 is spaced apart from the supporter 220, the light emitting device 252 may be misaligned with the light incident portion 243. Thus, it is not easy to dispose the printed circuit board 251 over the supporter 220 and couple the printed circuit board 251 to the supporter 220.

Figure 13:
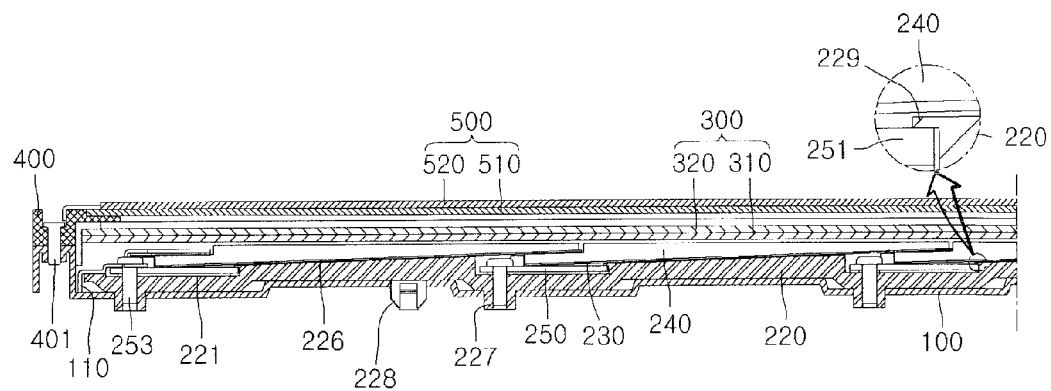
FIG. 13 is a cross-sectional view illustrating a display apparatus comprising a backlight unit according to an embodiment.
Figure 14:
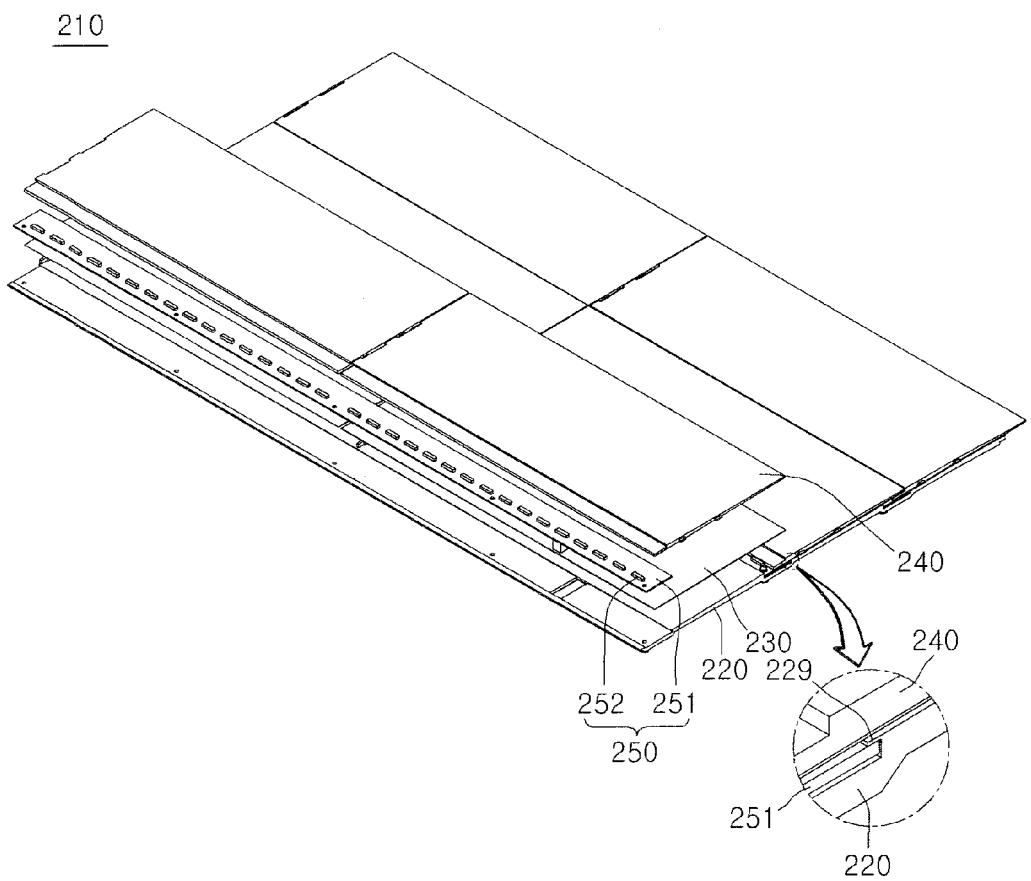
FIGS. 14 and 15 are schematic views illustrating a backlight unit according to an embodiment.
Figure 15:
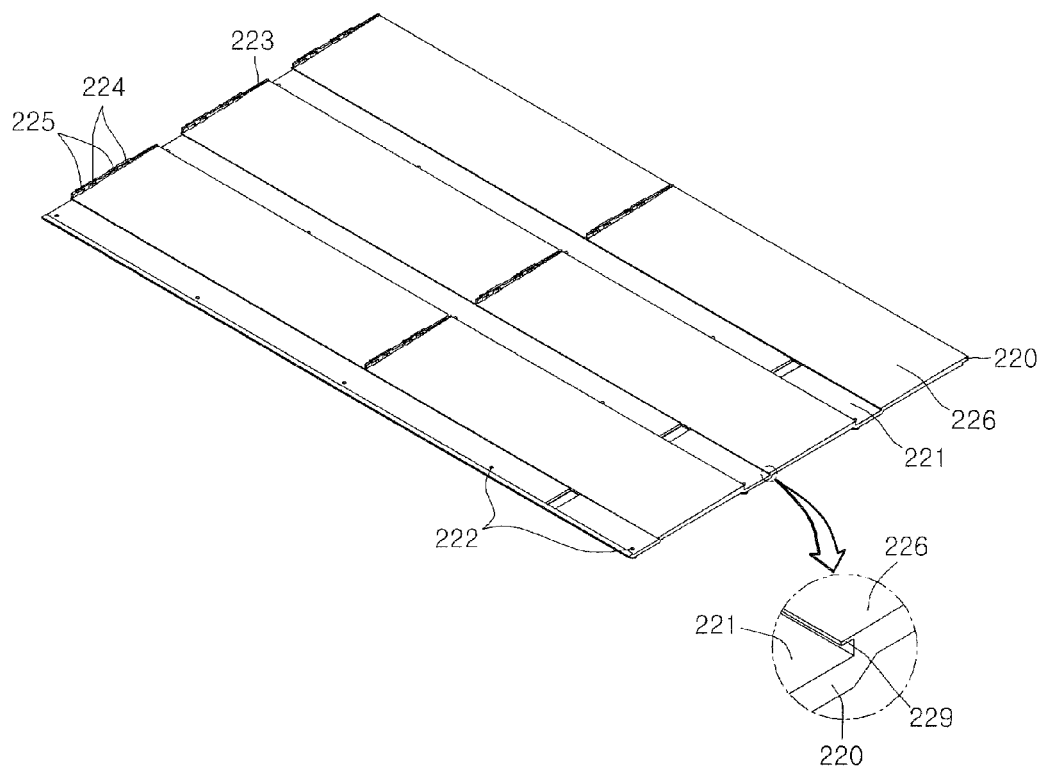

A backlight unit that can be easily assembled will now be described according to an embodiment with reference to FIGS. 13 to 15. FIG. 13 is a cross-sectional view illustrating a display apparatus comprising a backlight unit according to an embodiment. FIGS. 14 and 15 are schematic views illustrating a backlight unit according to an embodiment. A description of the same components as those of FIGS. 1 to 12 will be omitted.

According to an embodiment, the supporter 220 may further comprise stoppers 229. The supporter 220 may comprise the recess 221 and the inclination surfaces 226 on the upper surface thereof. The light emitting module 250 may be disposed in the recess 221, and the reflective sheet 230 and the light guide panel 240 may be disposed on the inclination surface 226. The recess 221 may be stepped at a lower height than that of the first region of the upper surface of the supporter 220. That is, the recess 221 may be stepped from the inclination surface 226. The protrusions 223 are disposed at the center and a side of the supporter 220, and the first coupling part 224 and the second coupling part 225 are disposed on the protrusion 223. The first coupling part 224 and the second coupling part 225 may be provided in the form of a hole or a recess.

The stoppers 229 may be formed of the same material as that of the supporter 220, or be formed of a different material and be coupled to the supporter 220. The stoppers 229 may be formed of the same material as that of the supporter 220, and thus, be integrally formed with the supporter 220 using injection molding or be formed using bending.

The stopper 229 may extend from the first region to the recess 221. That is, the stopper 229 may protrude from the inclination surface 226 to the recess 221. The stopper 229 overlaps the recess 221 and is spaced a predetermined distance from the recess 221.

At least one portion of the printed circuit board 251 may be inserted between the stopper 229 and the recess 221 and is supported therebetween. The stopper 229 makes it easy to position the printed circuit board 251 and prevents the printed circuit board 251 from being spaced apart from the supporter 220. Thus, the printed circuit board 251 can be coupled to the recess 221 at an intended position, and the light emitting devices 252 disposed on the printed circuit board 251 can be accurately aligned with the light incident portion 243 of the light guide panel 240.

According to the embodiment, the backlight unit and the display apparatus have a novel structure.

According to the embodiment, it is easy to align the light emitting module with the light guide panel.

According to the embodiment, it is easy to couple the light emitting module with the supporter.

According to the embodiment, it is easy to assemble the backlight unit and the display apparatus.

According to the embodiment, the backlight unit and the display apparatus stably operate regardless of variations in temperature and moisture.

According to the embodiment, the backlight unit and the display apparatus have uniform brightness.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
   at least one supporter comprising a recess stepped at a lower height than a height of a first region of an upper surface;
   at least one light guide panel disposed on the at least one supporter and coupled to the at least one supporter;
   at least one light emitting module disposed in the recess of the at least one supporter, that provides light through a side surface of the at least one light guide panel; and
   a reflective sheet including a first portion and a second portion connected to the first portion, the first portion disposed between the at least one supporter and the at least one light guide panel and the second portion disposed between the at least one light guide panel and the at least one light emitting module, wherein the at least one supporter comprises a stopper that protrudes from the first region into the recess, and wherein a portion of the stopper is disposed between a top surface of the at least one light emitting module and a bottom surface of the reflective sheet.

2. The backlight unit according to claim 1, wherein the at least one supporter and the at least one light guide panel are formed of a resin.

3. The backlight unit according to claim 1, further comprising a frame disposed under the at least one supporter, wherein the at least one supporter is coupled to the frame.

4. The backlight unit according to claim 3, wherein the frame comprises a hole, wherein the at least one supporter comprises a coupling protrusion on a surface thereof, and wherein the coupling protrusion is coupled to the hole.

5. The backlight unit according to claim 1, wherein the at least one light guide panel is coupled to at least one supporter.

6. The backlight unit, according to claim 1, wherein the at least one light guide panel comprises a protrusion on a side surface thereof, and wherein the at least one supporter comprises a coupling portion coupled to the protrusion.

7. The backlight unit according to claim 6, wherein the coupling portion comprises a recess or a hole.

8. The backlight unit according to claim 1, wherein the at least one supporter comprises one of polycarbonate and polymethyl methacrylate (PMMA).

9. The backlight unit according to claim 1, wherein the at least one light emitting module comprises:
   a printed circuit board coupled to the recess of the at least one supporter and comprising at least one portion disposed between the recess and the stopper; and a light emitting device disposed on the printed circuit board that provides light through a side surface of the at least one light guide panel.

10. The backlight unit according to claim 9, wherein the printed circuit board is coupled to the at least one supporter through at least one of a screw, an adhesive material, or a double-sided adhesive tape.

11. The backlight unit according to claim 1, wherein the stopper and the at least one supporter are formed of the same material.

12. A display apparatus, comprising:
a display panel; and
a backlight unit disposed under the display panel, wherein the backlight unit comprises:
   at least one supporter comprising a recess stepped at a lower height than a height of a first region of an upper surface;
   at least one light guide panel disposed on the at least one supporter and coupled to the at least one supporter;
   at least one light emitting module disposed in the recess of the at least one supporter, that provides light through a side surface of the at least one light guide panel; and
   a reflective sheet including a first portion and a second portion connected to the first portion, the first portion disposed between the at least one supporter and the at least one light guide panel and the second portion disposed between the at least one light guide panel and the at least one light emitting module, wherein the at least one supporter comprises a stopper that protrudes from the first region into the recess, and wherein a portion of the stopper is disposed between a top surface of the at least one light emitting module and a bottom surface of the reflective sheet.

13. The display apparatus according to claim 12, wherein the at least one supporter and the at least one light guide panel are formed of resin.

14. The display apparatus according to claim 12, further comprising a frame disposed under the at least one supporter, wherein the at least one supporter is coupled to the frame.

15. The display apparatus according to claim 14, wherein the frame comprises a hole, wherein the at least one supporter comprises a coupling protrusion on a surface thereof, and wherein the coupling protrusion is coupled to the hole.

16. The display apparatus according to claim 12, wherein the at least one light guide panel is coupled to at least one supporter.

17. The display apparatus according to claim 12, wherein the at least one light emitting module comprises:
   a printed circuit board coupled to the recess of the at least one supporter and comprising at least one portion disposed between the recess and the stopper; and
   a light emitting device disposed on the printed circuit board, that provides light through a side surface of the at least one light guide panel.

18. A backlight unit, comprising;
at least one supporter comprising a recess stepped at a lower height than a height of a first region of an upper surface;
at least one light guide panel disposed on the at least one supporter and coupled to the at least one supporter; and
at least one light emitting module disposed in the recess of the at least one supporter, that provides light through a side surface of the at least one light guide panel, wherein the at least one light guide panel comprises a protrusion on a side surface thereof, wherein the at least one supporter comprises a coupling portion coupled to the protrusion, and wherein the at least one supporter comprises a stopper that protrudes from the first region into the recess, and wherein a portion of the stopper is disposed between a top surface of the at least one light emitting module and a bottom surface of the at least one light guide panel.

19. The backlight unit according to claim 1, wherein the at least one supporter comprises an inclined top surface, and wherein the reflective sheet comprises an inclined bottom surface corresponding to the inclined top surface of the at least one supporter.

20. The backlight unit according to claim 1, wherein the at least one light emitting module is disposed under the reflective sheet.

* * * * *